April 28, 1970 W. RINDNER ET AL 3,509,491

VOLTAGE-TUNABLE GUNN-TYPE MICROWAVE GENERATOR

Filed June 2, 1967

INVENTORS
Wilhelm Rindner &
Harold Roth
BY
ATTORNEYS 3,509,491

VOLTAGE-TUNABLE GUNN-TYPE MICROWAVE GENERATOR

Wilhelm Rindner, Lexington, and Harold Roth, Needham, Mass., assignors to the United States of America as represented by the Administrator of the National Aeronautics and Space Administration Filed June 2, 1967, Ser. No. 644,444
Int. Cl. H03b *7/14, 11/10, 15/00*
U.S. Cl. 331—107 6 Claims

ABSTRACT OF THE DISCLOSURE

In one embodiment, a Gunn-effect semiconductor chip having a varying cross-sectional area is mounted between a pair of contacts. An electric field gradient exists along the current axis of the chip when a voltage is applied to the contacts. This electric field in combination with the variation in cross-sectional area causes the generated frequency to vary in accordane with the applied voltage when the voltage is above the critical Gunn level for a portion of the current axis. That is, a variation in the applied voltage varies the length of the portion of the field above the threshold level to vary the frequency of the output signal. In an alternate embodiment, the electric field gradient is created by non-uniform doping of the semiconductor block.

The invention described herein was made by employees of the United States Government and may be manufactured and used by or for the Government for governmental purposes without the payment of any royalties thereon or therefor.

BACKGROUND OF THE INVENTION

One of the recently developed devices in the rapidly evolving semiconductor field is the Gunn microwave generator. This device is described in an article entitled "Instabilities of Current in III–V Semiconductors" by J. B. Gunn, published in the IBM Journal of Research and Development for April 1964, pp. 141–159.

Generally, the Gunn generator comprises a flat rectangular or cylindrical chip of a homogeneous semiconductor material. Usually the semiconductor is a combination of elements from Group III-V of the Periodic Table such as galium arsenide or indium phosphide, for example. Contacts are applied to the two end faces of the chip.

In operation, a voltage is applied to the chip which creates an electric field across the chip. When the electric field reaches a critical value known as the threshold level *fr*, the device generates an output signal of a stable frequency. That is, the applied voltage creates an electric field across the semiconductor chip and when this voltage level reaches a threshold or critical value the output signal from the device is frequency constant. The voltage may rise above the threshold level but the frequency remains constant. The actual frequency of the signal is determined by the distance between the contacts.

While the Gunn device as described above and in the foregoing article is a substantial step forward in the art because it is geometrically small, compact and reliable, it has certain limitations. For example, because this prior art device is limited to a specific frequency determined by the distance between the contacts, it lacks versatility. That, is it can only operate at a particular frequency and not over a frequency range, as is desirable in many environments. Further, because of the physical problems of creating a particular separation between the contacts, it is extremely difficult to create a device that operates at a specific predetermined frequency. Rather, a number of Gunn generators must be created and checked to determine their frequency of operation. Subsequently, those that operate at the desired frequencies are chosen. This method of obtaining a Gunn generator, inter alia, increases the cost of the device.

Therefore, it is an object of this invention to provide a new and improved semiconductor device that is frequency stable but generates signals of different frequencies over a range of frequencies.

It is also an object of this invention to provide a new and improved Gunn generator that generates a signal having a frequency related to the voltage applied to its contacts.

It is still another object of this invention to provide a new and improved Gunn generator that generates signals over a frequency range.

It is still another object of this invention to provide a new and improved Gunn semiconductor microwave generator.

SUMMARY OF THE INVENTION

In accordance with one embodiment of the invention, a new and improved Gunn-type semiconductor generator is provided by creating an electric field gradient above the threshold level along only a portion of the current axis between the contacts of the device. Therefore, when the voltage creating the electric field gradient varies, the length of the field above the threshold level varies, to cause the frequency generated by the Gunn generator to vary.

In accordance with a further principle of the invention, an electric field gradient, wherein only a portion of the field is above the threshold level, is created by physically varying the cross-sectional area of the semiconductor chip between the contacts. That is, the cross-sectional area along the current axis of the chip is varied so that when a voltage is applied to the contacts, an electric field above the threshold potential is created along only a portion of the current axis.

In accordance with a still further principle of the invention, the electric field gradient is created by varying the doping of the chip between the contacts. This variation in doping creates the same effect as the physical cross-sectional change described in the preceding paragraph. That is, when the voltage applied to the contacts varies, the electric field along the current axis that is above the threshold level varies, to vary the frequency of the generated signal.

Varying either the cross-sectional area or the doping of a conventional Gunn generator creates a variable frequency generator that is geometrically small, compact and reliable. These changes provide a device whose output frequency can be easily controlled by controlling the bias voltage applied to the device. The device does not have to be designed to generate a particular frequency as with prior art devices, since merely controlling the voltage applied to the device creates a signal of the desired frequency. Hence, the device is useful, for example, as a voltage controlled oscillator, as a modulator, etc.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Prior art Gunn devices are formed of flat rectangular or circular chips of Group III–V semiconductor compounds such as gallium arsenide or indium phosphide, for example. A pair of contacts are attached to the parallel, flat surfaces. The chip has both uniform cross-sectional area and uniform doping; for example, the chip may be doped with tellurium to give it N-type properties.

For operation, the device requires that a minimum threshold electric field be created along the current axis of the device. This electric field is created by applying an electric potential across the contacts. When the electric field exceeds the threshold level, the device generates a stable microwave signal at a frequency determined by the distance between the two contacts.

This invention improves upon the prior art devices by creating a device wherein the electric field gradient along the current axis of the device is such that the threshold level only exists along a portion of the axis. When the applied voltage that creates the electric field varies, it varies the portion of the electric field that is above the threshold level to vary the frequency of the generated signal. FIGS. 1, 2, 3 and 4 illustrate embodiments of the invention made in accordance with the concept of the invention. It should be noted that these figures are longitudinally distorted to better illustrate the inventive concept.

Figures 1, 2:
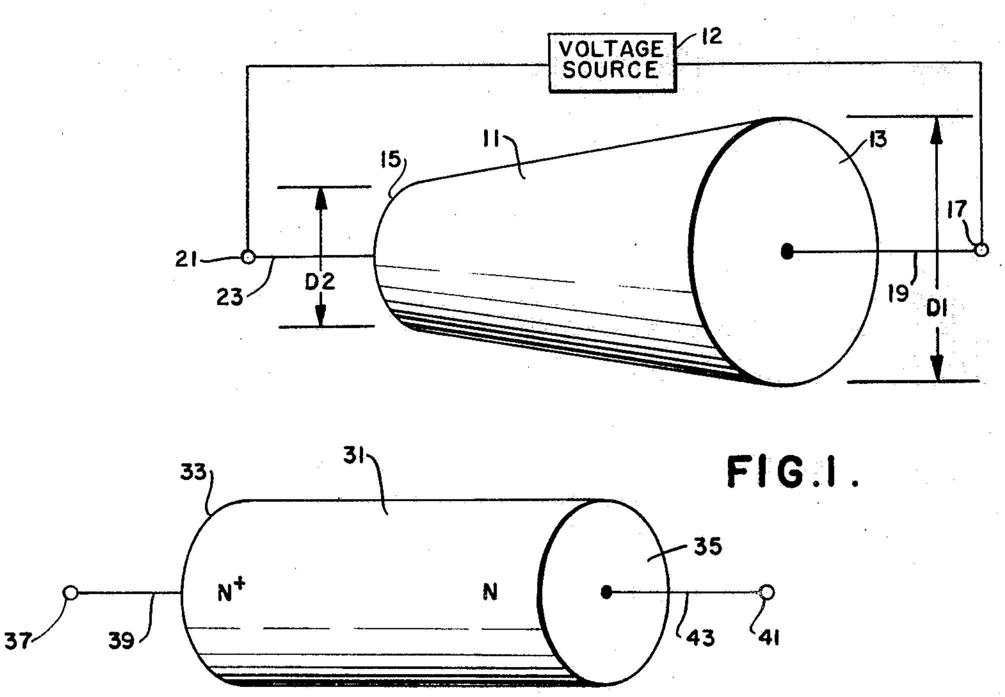
FIG. 1 is an illustration of one embodiment of the invention utlizing a chip of uniformly decreasing (or increasing) varying cross-section.
FIG. 2 is an illustration of an alternative embodiment of the invention employing a doped configuration.

The embodiment of the invention illustrated in FIG. 1 comprises a chip of semiconductor material 11, a first contact surface 13 and a second contact surface 15. A terminal 17 is connected by a conductor 19 to the first contact surface 13 and a terminal 21 is connected by a conductor 23 to the second surface 15. The embodiment illustrated in FIG. 1 is in the form of a truncated-cone having the first surface diameter D1 larger than the second surface diameter D2; hence, the cross-sectional area between the two surfaces varies along the current axis of the device. The surfaces 13 and 15 may be parallel to each other. It is this variation in cross-sectional area that provides the unique results of the invention.

Preferably, the semiconductor chip 11 is formed of a Group III–V semiconductor compound that is appropriately doped to create an N-type device.

In operation, a potential from a voltage supply 12 is applied between terminal 17 and 21 to create an electric field gradient between the surfaces 13 and 15. The terminals 17 and 21 are connected to the positive and negative side, respectively, of the voltage source. The potential must be large enough to create an electric field above the threshold level along a portion of the current axis between the contacts. When this threshold level is reached, the output signal across the same terminals 17 and 21 is at a first frequency. By further increasing the potential or bias across the terminals 17 and 21 the frequency of the output signal on these terminals changes. Hence, the device is a voltage-controlled oscillator. That is, as the applied voltage changes the output frequency changes. Further, the device can be used as a modulator in that when the applied voltage is modulated the output frequency is modulated.

Figure 3:
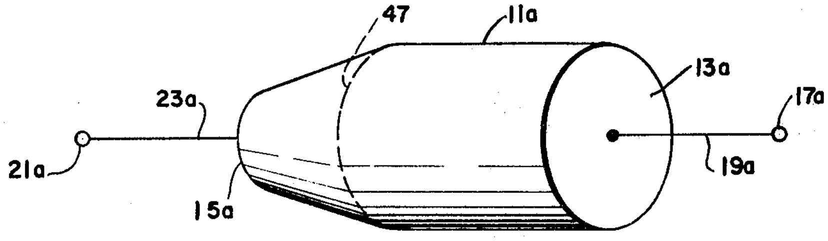
FIGS. 3 and 4 are further variations of the FIG. 1 embodiment but utilize chips of non-uniform varying cross-section.
Figure 4:
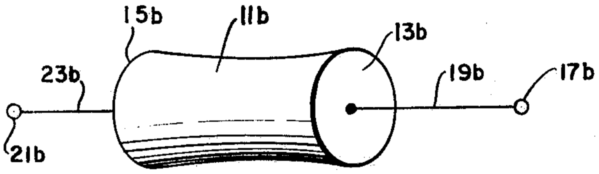

FIGS. 3 and 4 illustrate embodiments of the invention that are similar to FIG. 1 illustration except that the chips **11*a* and 11*b* have no uniform varying cross-sections. For example, at 47 in FIG. 3, the surface of the chip 11*a* changes abruptly. Similarly, in FIG. 4, the surfaces of chip 11*b*** may be exponential, or the like. It will be noted that similar reference numerals denote like parts in FIGS 1, 3 and 4.

FIG. 2 illustrates a further alternative embodiment of the invention that comprises a semiconductor chip 31 having a first surface 33 and a second surface 35. A first terminal 37 is connected to the first surface 33 by a conductor 39 and a second terminal 41 is connected to the second surface 35 by a conductor 43. The terminals 37 and 41 are connected to the positive and negative side, respectively, of the voltage source. The embodiment illustrated in FIG. 2 has a substantially constant cylindrical cross-section between the first and second surfaces. Hence, this configuration is similar to a conventional Gunn device.

While the configuration of the embodiment illustrated in FIG. 2 is similar to a conventional Gunn device, the doping is not. That is, whereas in prior art Gunn devices the doping between the first and second surfaces was uniform, the doping between the first and second surfaces of FIG. 2 is varied. More specifically, the doping near the first surface 33 may be higher (illustrated as N+) than the doping near the second surface 35 (illustrated as N). This variation in doping provides a similar effect as the physical cross-sectional variations illustrated in the other figures. That is, the variation in doping between the first and second surfaces 33 and 35 creates a device wherein only a portion of the electric field gradient along the current axis is above the threshold level for a particular bias voltage. Hence, a stable output signal frequency is achieved. And, when the bias voltage is varied the portion of the electric field above the threshold level varies to vary the output signal frequency. As described with respect to FIG. 1, the device can operate, for example, as a voltage-controlled oscillator or as a modulator. It is to be understood that the fields necessary to sustain the Gunn-type oscillations and the field levels at which the domains are extinguished are given by conventional Gunn effect theory as described in the aforecited article by J. B. Gunn. Namely, nucleation commences in regions of the highest field. For example, in FIGURES 1, 3, and 4, nucleation starts where the cross-section is smallest—which is where the field is the highest. And in FIGURE 2, nucleation starts where the doping is the least—which is where the field is highest. Extinction is in that part if the device away from the cathode where the electric field is inadequate to sustain Gunn domains.

It will be appreciated by those skilled in the art and others that the embodiments of the invention illustrated in FIGS. 1, 2 and 3 are only by way of example. In general, what is required with respect to the type of embodiment illustrated in FIGS. 1, 3 and 4 is that the device have a varying cross-sectional area between the two surfaces. For example, the device could be a square-or rectangular-shaped chip having a pair of surfaces with a varying cross-sectional area between the surfaces.

It will be further appreciated by those skilled in the art that the means for creating the electric field gradient illustrated in the figures could be combined. That is, both the cross-sectional area effect and the variation in doping effect could be used to create an overall effect in a combined device. In this manner the overall device would have enhanced benefits.

Hence, the invention may be practiced otherwise than as specifically described herein.

What is claimed is:

1. A semiconductor variable frequency Gunn-effect oscillator enabling continuous electronic control of the output frequency comprising:

a chip of Gunn-effect semiconductor material forming a truncated cone between a pair of opposed surfaces; and means forming a part of said chip and associated with said surfaces for applying a potential to create an electric field gradient between said surfaces to cause said device to generate a signal whose frequency is dependent upon the amplitude of the potential.

2. A device as claimed in claim 1 wherein said chip is formed of gallium arsenide.

3. A device as claimed in claim 1 wherein said chip is formed of indium phosphide.

4. A semiconductor variable frequency Gunn-effect oscillator enabling continuous electronic control of the output frequency comprising:

a chip of Gunn-effect semiconductor material having a pair of opposed surfaces, the material between said surfaces containing varying doping concentrations and having varying cross-sectional areas; and means forming a part of said chip and associated with said surfaces for applying a potential to create an electric field gradient between said surfaces to cause said device to generate a signal whose frequency is dependent upon the amplitude of the potential.

5. A device as claimed in claim 4 wherein said chip is formed of gallium arsenide.

6. A device as claimed in claim 4 wherein said chip is formed of indium phosphide.

References Cited

UNITED STATES PATENTS

| | | | |
|---|---|---|---|
| 3,365,583 | 1/1968 | Gunn | 331—107 X |
| 3,377,566 | 4/1968 | Lanza | 331—107 |

ROY LAKE, Primary Examiner

S. H. GRIMM, Assistant Examiner

U.S. Cl. X.R.

307—322; 317—235